United States Patent
Takaki et al.

(10) Patent No.: US 10,605,374 B2
(45) Date of Patent: Mar. 31, 2020

(54) VALVE SEAT INSERT EXCELLENT IN WEAR RESISTANCE MADE OF IRON-BASE SINTERED ALLOY FOR INTERNAL COMBUSTION ENGINES, AND ASSEMBLY OF VALVE SEAT INSERT AND VALVE

(71) Applicant: NIPPON PISTON RING CO., LTD., Saitama (JP)

(72) Inventors: Seisuke Takaki, Tochigi (JP); Hiroshi Oshige, Tochigi (JP); Ayato Oikawa, Tochigi (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 165 days.

(21) Appl. No.: 15/822,857

(22) Filed: Nov. 27, 2017

(65) Prior Publication Data
US 2018/0149280 A1   May 31, 2018

(30) Foreign Application Priority Data

Nov. 28, 2016 (JP) ................. 2016-230204
Sep. 15, 2017 (JP) ................. 2017-177448

(51) Int. Cl.
*F16K 25/00* (2006.01)
*F02M 63/00* (2006.01)
(Continued)

(52) U.S. Cl.
CPC .......... *F16K 25/005* (2013.01); *C22C 38/02* (2013.01); *C22C 38/04* (2013.01); *C22C 38/10* (2013.01); *C22C 38/12* (2013.01); *C22C 38/18* (2013.01); *F02M 63/0012* (2013.01); *B22F 2998/10* (2013.01); *C22C 33/0292* (2013.01)

(58) Field of Classification Search
CPC ... F16K 25/005; F02M 63/0012; C22C 38/18; C22C 38/02; C22C 38/04; C22C 38/10; C22C 38/12; C22C 33/0292; B22F 2998/10; B22F 2009/041; B22F 2003/023; B22F 3/10; B22F 5/008; B22F 2003/247

See application file for complete search history.

(56) References Cited

U.S. PATENT DOCUMENTS

| | | | |
|---|---|---|---|
| 5,870,989 A | 2/1999 | Takahashi et al. | |
| 2002/0084004 A1* | 7/2002 | Takahashi ........... | C22C 33/0207 148/320 |
| 2017/0175596 A1* | 6/2017 | Ikemi ................. | F01L 3/02 |

FOREIGN PATENT DOCUMENTS

JP    05-005163    1/1993
JP    10-226855    8/1998

* cited by examiner

*Primary Examiner* — Marina A Tietjen
(74) *Attorney, Agent, or Firm* — Young & Thompson

(57) ABSTRACT

A valve seat insert made of an iron-base sintered alloy is configured to have a structure in which the base matrix phase is a fine carbide precipitation phase in which a fine carbide being 10 μm or less in size is precipitated and which has a hardness of 550 HV or more in Vickers hardness; and in the base matrix phase, hard-particles having a hardness of 650-1200 HV in Vickers hardness are dispersed in an area percentage of 20-40%, a diffusional phase is formed in an area percentage of more than 0% and not more than 5%, and solid-lubricant particles are dispersed in an area percentage of 0-5%. Even if a valve having a high face hardness of 400 HV or more, or 600 HV or more is used, a facing valve seat insert wears only slightly, improving valve train durability.

11 Claims, 1 Drawing Sheet

(51) Int. Cl.
*C22C 38/18* (2006.01)
*C22C 38/12* (2006.01)
*C22C 38/10* (2006.01)
*C22C 38/04* (2006.01)
*C22C 38/02* (2006.01)
*C22C 33/02* (2006.01)

VALVE SEAT INSERT EXCELLENT IN WEAR RESISTANCE MADE OF IRON-BASE SINTERED ALLOY FOR INTERNAL COMBUSTION ENGINES, AND ASSEMBLY OF VALVE SEAT INSERT AND VALVE

BACKGROUND

Technical Field

The present invention relates to valve seat inserts for internal combustion engines and particularly relates to improvement in the wear resistance of valve seat inserts for internal combustion engines in which gas fuels such as LPG and CNG, or special fuels such as ethanol-containing fuels are used.

Related Art

A valve seat insert is press fitted or bonded to a cylinderhead of an internal combustion engine and plays a role to seal combustion gas and cool a valve. Since a valve seat insert is exposed to hit by a valve, wear by sliding, heating by combustion gas, corrosion by combustion products, etc., it has heretofore been required to be superior in heat-resistance and wear resistance. Recently, requisitions to automotive internal combustion engines for improvement in fuel consumption, cleaning of exhaust gas, etc. in addition to improvement in performance have increased from the viewpoint of preservation of the global environment. In order to cope with such requisitions, operation conditions of automotive internal combustion engines are set to be strict conditions, the combustion condition becomes severer, and the use environment of valve seat inserts also becomes more severer. Hence, there is a problem that conventional valve seat inserts are insufficient in such properties as heat-resistance and wear resistance.

With respect to such a problem, for example, in JP-A-10-226855 is disclosed "a valve seat insert made of a wear-resistant sintered alloy for internal combustion engines." The technology disclosed in JP-A-10-226855 is a valve seat insert excellent in wear resistance for internal combustion engines, the main structure of which is an iron-base matrix structure formed of a mixed structure composed of 30 to 95% in area ratio of a first phase containing Fe as a main component in which a fine carbide being 10 µm or less in size is precipitated and which has a hardness of 400 HV or more, and 5 to 70% in area ratio of a second phase containing Fe as a main component and being softer than the first phase. It is reported in JP-A-10-226855 that according to the technology disclosed therein, wear resistance is improved by making the first phase with such a high hardness be present in a content of 30% or more. It is also reported that the valve seat insert disclosed in JP-A-10-226855 is suitable as a valve seat insert for internal combustion engines to be operated under severe conditions.

In JP-A-5-5163 is disclosed an iron-base sintered material having a porous martensite matrix with a composition consisted by 8 to 12% by weight of chromium, 0.5 to 3% by weight of molybdenum, 1.5% by weight or less of vanadium, 0.2 to 1.5% by weight of carbon, 2% by weight, at most, of other impurities, and iron as the rest, and characterized in that the matrix contains submicroscopic particles of a carbide rich in molybdenum dispersed substantially uniformly.

SUMMARY

In recent years, the variety of fuels to be used in internal combustion engines has multifaceted to include special fuels such as gas and ethanol in addition to gasoline, heavy oil, etc. Different fuels to be used require different combustion conditions, such as combustion temperature and combustion gas to be generated, and also are assumed to require different use environments of internal combustion engines. For example, when the fuel to be used is a gas fuel, the use environment of a valve seat insert, etc. is severer. The reason for this is conceivably that a gas fuel is more difficult to yield combustion products as compared with gasoline or light oil and therefore it is in an environment where wear from metallic contact is prone to advance.

In addition, conventionally, a nitride film formed on a surface on a valve in order to improve the sliding property thereof would be removed by polishing or the like near a contact face with a valve seat insert. However, the recent increasing requisition for cost reduction omits polishing or the like for removing a nitride film, etc. even near a contact face with a valve seat insert. Often times, a valve is used with a nitride film or the like formed on a valve face remaining intact, more particularly, with the nitride film or the like remaining thin on the abutting face with a valve seat insert even if being near a contact face with the valve seat insert. The nitride film to be formed on a surface is as hard as 1000 HV or more, and when such a valve is used, wear will occur significantly even if a valve seat insert produced using the technology disclosed n JP-A-10-226855 or JP-A-5-5163 is used, and especially, there is a problem that remarkable wear will occur under a use environment where metallic contact easily occurs, e.g., under use of a special fuel like a gas fuel.

The object of the present invention is to solve such problems and provide a valve seat insert excellent in wear resistance made of an iron-base sintered alloy for internal combustion engines, the valve seat insert being capable of maintaining good wear resistance even under a use environment where metallic contact is prone to occur, such as use of a special fuel like a gas fuel, and provide an assembly of a valve and a valve seat insert excellent in wear resistance. From the viewpoint of formability and falling-off resistance, the valve seat insert targeted by the present invention is regulated to have a radial crushing strength determined according to the provision of JIS Z 2507 of 45 kgf/mm² (441 MPa) or more.

In order to attain the above-described object, the present inventors intensively investigated factors having effects on the wear resistance of a valve seat insert when combining the valve seat insert with a valve having a face "harder" than conventional valves. As a result, they found that a combination of such a "harder" valve with a conventional type of valve seat insert such as that disclosed in JP-A-10-226855 has a problem that the valve seat insert suffers from adhesion and wear resistance deteriorates significantly especially under a use environment where metallic contact is prone to occur, such as use of a special fuel like a gas fuel. The present inventors found that such deterioration of wear resistance was due to containing of a soft phase in the structure of the valve seat insert, and they have realized that in order to prevent such deterioration of wear resistance, it is effective to reduce the hardness difference between the valve face and the base matrix phase and hard-particles. Specifically, they found that in order to prevent deterioration of the wear resistance of a valve seat insert, it is effective to reduce a soft phase and produces a base matrix phase having a structure formed of an approximately uniform, hard phase having a hardness of 550 HV or more.

Moreover, the present inventors found that a valve seat insert excellent in wear resistance and radial crushing strength can be obtained by employing a valve seat insert with a structure in which the base matrix phase is a fine carbide precipitation phase in which a fine carbide having a particle diameter of 10 μm or less is precipitated and which has a hardness of 550 HV or more in Vickers hardness and hard-particles having a hardness of 650 HV or more in Vickers hardness are dispersed in the base matrix phase.

The invention has been accomplished by a further investigation based on such findings. That is, the gist of the invention is as follows:

(1) A valve seat insert excellent in wear resistance made of an iron-base sintered alloy for internal combustion engines in which hard-particles and solid-lubricant particles are dispersed in a base matrix phase, wherein the valve seat insert has a structure in which the base matrix phase is a fine carbide precipitation phase in which a fine carbide having a particle diameter of 10 μm or less is precipitated and which has a hardness of 550 HV or more in Vickers hardness; the hard-particles have a hardness of 650 to 1200 HV in Vickers hardness; and in the base matrix phase, the hard-particles are dispersed in an area percentage of 20 to 40%, and further a diffusional phase is formed around the hard-particles in an area percentage of more than 0% and not more than 5%, and the solid-lubricant particles are dispersed in an area percentage of 0 to 5%.

(2) The valve seat insert made of an iron-base sintered alloy for internal combustion engines set forth in (1), wherein a base matrix part containing the base matrix phase, the diffusional phase, the hard-particles, and the solid-lubricant particles has a composition comprising, in % by mass, C: 0.5 to 2.0%, Si: 0.5 to 2.0%, Mn: 5% or less, Cr: 2 to 15%, Mo: 5 to 20%, and Co: 2 to 30%, and further one species or two or more species selected from among V: 0 to 5%, W: 0 to 10%, Ni: 0 to 5°, S: 0 to 2%, Cu: 0 to 5%, Ca: 0 to 5%, and F: 0 to 5%, the balance being Fe and inevitable impurities.

(3) The valve seat insert made of an iron-base sintered alloy for internal combustion engines set forth in (1) or (2), wherein the hard-particles are of one species or two or more species selected from among Mo—Cr—Co-type intermetallic compound particles comprising, in % by mass, Cr: 3 to 15% and Mo: 20 to 40°, further Si: 0 to 3% and Fre: 0 to 3%, the balance being Co and inevitable impurities, Mo—Cr—Ni—Co-type intermetallic compound particles comprising Mo: 20 to 30%, Ni: 5 to 20%, and Cr: 15 to 35%, further Si: 0 to 3%, the balance being Co and inevitable impurities, Mo—Cr—Fe-type intermetallic compound particles comprising Mo: 20 to 40% and Cr: 3 to 15%, further Si: 0 to 3%, the balance being Fe and inevitable impurities, and Mo—Fe—Co-type intermetallic compound particles comprising Mo: 30 to 50% and Fe: 15% or less, further Cr: 2 to 8% and Si: 0 to 4%, the balance being Co and inevitable impurities.

(4) The valve seat insert made of an iron-base sintered alloy for internal combustion engines set forth in (2) or (3), wherein the solid-lubricant particles are of one species or two or more species selected from among manganese sulfide MnS, molybdenum disulfide $MoS_2$, and calcium fluoride $CaF_2$.

(5) An assembly excellent in wear resistance of a valve and a valve seat insert, wherein the valve is a valve having the face hardness of the contacting face with the valve seat insert being 400 to 1300 HV in Vickers hardness, and the valve seat insert is the valve seat insert made of an iron-base sintered alloy for internal combustion engines set forth in any one of (1) to (4).

According to the present invention, even if a high face hardness valve having a hard face is used as a valve in an internal combustion engine under an environment where a special fuel like a gas fuel is used, which is a severe wear environment, a facing valve seat insert suffers from wear only slightly and an assembly excellent in wear resistance of a valve and a valve seat insert can be fabricated actually, and as a result, an industrially remarkable effect can be attained. Additionally, according to the present invention, an effect that the durability of a valve train is improved remarkably is also attained.

DETAILED DESCRIPTION

The valve seat insert made of an iron-base sintered alloy of the present invention is a valve seat insert having a structure in which hard-particles and, optionally, solid-lubricant particles are dispersed in a base matrix phase. The base matrix phase is a phase having a hardness of 550 HV or more in Vickers hardness.

If the hardness of the base matrix phase is less than 550 HV, adhesion is prone to occur upon contact with a valve, especially contact with a valve high in face hardness, and a desired wear resistance cannot be ensured. On the other hand, if the base matrix phase is hard over 700 HV, toughness as a sintered body will deteriorate. For this reason, the hardness of the base matrix phase is limited to a range of 550 HV or more and preferably 700 HV or less in Vickers hardness. The hardness is preferably 600 to 650 HV.

The base matrix phase having such hardness is configured to be formed of a hard single phase structure being a fine carbide precipitation phase in which a fine carbide 10 μm or less in size is precipitated. The "single phase" as referred to herein means that the phase occupies 95% or more in area percentage. It is tolerable that the area percentage is less than 5% because an effect on wear resistance is small even if a phase with a hardness of less than 550 HV remains in the base matrix phase.

If the particle diameter of the carbide that precipitates in the base matrix phase is larger than 10 μm, the base matrix phase will deteriorate in hardness and toughness, opposite aggressiveness will increase, and radial crushing strength will decrease. For such reasons, the base matrix phase having a hardness of 550 HV or more is preferably a fine carbide precipitation phase in which a fine carbide 10 μm or less in size is precipitated.

The base matrix phase with the above-described hardness and structure preferably has a composition comprising, in % by mass, C: 0.5 to 2.0%, Si: 0 to 1.0%, Mn: 0.05 to 5%, Cr: 0 to 5.0%, Mo: 0 to 8.0%, V. 0 to 5.0%, W: 0 to 10.0%, and Co: 0 to 5.0% the balance being Fe and inevitable impurities.

The valve seat insert of the present invention has a structure in which hard-particles and optionally solid-lubricant particles are dispersed in the base matrix phase having the above-described hardness, composition, and structure. The hard-particles to be dispersed are configured to be hard-particles having a hardness of 650 to 1200 HV in Vickers hardness. If the hardness of the hard-particles is less than 650 HV, the effect of improving wear resistance is small, whereas deterioration in machinability will be induced if the hardness is as high as over 1200 HV. For such reasons, the hardness of the hard-particles to be dispersed in the base matrix phase is limited within the range of 650 to 1200 HV in Vickers hardness.

In the present invention, the hard-particles to be dispersed in the base matrix phase is preferably configured to be particles having the above-described hardness and having an average particle size of 10 to 150 µm. If the average particle size is less than 10 µm, the hard-particles are prone to diffuse during sintering and a desired improvement in wear resistance cannot be ensured. On the other hand, if the average particle size is larger than 150 µm, the bonding strength to a base-matrix will decrease. For this reason, the average particle size of the hard-particles to be dispersed in the base matrix phase is preferably limited within the range of 10 to 150 µm. The "average particle size" as referred to herein means a particle diameter D50 at which the cumulative distribution measured by a laser diffraction method becomes 50%.

In the valve seat insert of the present invention, hard-particles with the above-described hardness are dispersed in the base matrix phase in an area percentage of 20 to 40%. If the hard-particle dispersion amount is less than 20%, a desired wear resistance under a severe environment condition cannot be ensured. On the other hand, if the hard-particle dispersion amount is more than 40%, the bonding strength between the base matrix phase and the hard-particles will decrease and the wear resistance will deteriorate.

The hard-particles to be used in the valve seat insert of the present invention are preferably configured to be one species or two or more species selected from among Mo—Cr—Co-type intermetallic compound particles, Mo—Cr—Ni—Co-type intermetallic compound particles, Mo—Cr—Fe-type intermetallic compound particles, and Mo—Fe—Co-type intermetallic compound particles.

The Mo—Cr—Co-type intermetallic compound particles have a composition comprising, in % by mass, Cr: 3 to 15%, Mo: 20 to 40% and further Si: 0 to 3% and Fe: 0 to 3% the balance being Co and inevitable impurities, and the hardness thereof is 650 to 850 HV after sintering. The Mo—Cr—Ni—Co-type intermetallic compound particles have a composition comprising, in % by mass, Mo: 20 to 30%, Ni: 5 to 20% and Cr: 15 to 35% and further Si: 0 to 3% the balance being Co and inevitable impurities, and the hardness thereof is 900 to 1200 HV after sintering. The Mo—Cr—Fe-type intermetallic compound particles have a composition comprising, in % by mass, Mo: 20 to 40%, Cr: 3 to 15% and further Si: 0 to 3% the balance being Fe and inevitable impurities, and the hardness thereof is 750 to 1050 HV after sintering. The Mo—Fe—Co-type intermetallic compound particles have a composition comprising, in % by mass, Mo: 30 to 50%, Fe: 15% or less and further Cr: 2 to 8% and Si: 0 to 4% the balance being Co and inevitable impurities, and the hardness thereof is 900 to 1200 HV after sintering.

The valve seat insert of the present invention has a structure in which a diffusional phase is generated around hard-particles. The diffusional phase is a phase formed during sintering as a result of diffusion of alloy elements from the hard-particles into the base matrix phase and have an action of preventing the hard-particles from falling off from the base matrix phase. For this reason, even if a large amount of hard-particles are dispersed, the hard-particles can be prevented from falling off from the base matrix phase and, therefore, it is believed that the decrease of radial crushing strength can be suppressed by the presence of the diffusional phases.

In order to obtain such an effect, it is preferable to adjust the presence amount of the diffusional phase to an area percentage of more than 0% and not more than 5%. If the diffusional phase is present in a large amount of over 5%, the hardness will decrease and a desired wear resistance cannot be ensured. The formation of the diffusional phase depends on the temperature during sintering and the sintering time, and it is preferred to adjust the temperature and the time of sintering treatment in such a manner that the above-described presence amount (5% or less in area percentage) is attained.

In the valve seat insert of the present invention, solid-lubricant particles further may be dispersed in an area percentage of 0 to 5% in the base matrix phase. Machinability, formability, and lubricity are improved by dispersing the solid-lubricant particles in the base matrix phase. However, if the area percentage exceeds 5%, the progress of a sintering reaction will be disturbed and deterioration of mechanical properties will be induced. For this reason, the amount of the solid-lubricant particles is preferably limited within the range of 0 to 5% in area percentage. Examples of the solid-lubricant include manganese sulfide MnS, molybdenum disulfide $MoS_2$, and calcium fluoride $CaF_2$.

As described above, in the base matrix phase having the above-described hardness and structure, the valve seat insert of the present invention has a structure in which hard-particles with the above-described hardness and solid-lubricant particles with the above-described composition are dispersed in prescribed amounts and a diffusional phase is formed around the hard-particles.

The base matrix part containing the base matrix phase, the hard-particles, and the solid-lubricant particles has a composition comprising, in % by mass, C: 0.5 to 2.0%, Si: 0.5 to 2.0%, Mn: 5% or less, Cr: 2 to 15%, Mo: 5 to 20%, Co: 2 to 30% and further one species or two or more species selected from among V: 0 to 5%, W: 0 to 10%, Ni: 0 to 5%, S: 0 to 2%, Cu: 0 to 5%, Ca: 0 to 5%, and F: 0 to 5%, the balance being Fe and inevitable impurities.

Hereinafter, the reasons for the limitations in the base matrix part composition are explained. Hereinafter, "% by mass" in a composition is expressed simply by "%."

C: 0.5 to 2.0%

C is an element necessary in order to adjust the base matrix phase to a prescribed hardness and structure or in order to form a carbide, and it is contained in a content of 0.5% or more. If it is contained in a content of more than 2.0%, the melting point will lower and liquid sintering will occur. If liquid sintering occurs, the precipitated carbide amount becomes excessively large, the number of pores increases, elongation properties deteriorate, and dimensional accuracy deteriorates. For this reason, it is preferable to limit the content of C within the range of 0.5 to 2.0%. More preferably, the content of C is 0.5 to 1.75%.

Si: 0.5 to 2.0%

Si is an element that is contained mainly in hard-particles and forms a silicide and enhances hardness, and it is preferably contained in 0.5% or more. On the other hand, if Si is contained in a large content of more than 2.0%, toughness will deteriorate. For this reason, it is preferable to limit the content of Si within a range of 0.5 to 2.0%. More preferably, the content of Si is 0.5 to 1.5%.

Mn: 5% or Less

Mn is an element that increases the hardness of the base matrix phase, and Mn is an element that is contained in the base matrix part due to inclusion of solid-lubricant particles and contributes to machinability improvement, and it is preferably contained in 0.05% or more. On the other hand, since inclusion in a content of more than 5% leads to deterioration of the base matrix phase in hardness, toughness, and ductility, the content of Mn is preferably limited to 5% or less. The content of Mn is more preferably 0.05 to 3.5%.

Cr: 2 to 15%

Cr is an element that is to be in s solution in the base matrix phase, forms a carbide, increases the hardness of the base matrix phase, further increases the hardness of hard-particles, and improves heat-resistance and wear resistance, and it is preferably contained in 2% or more. On the other hand, containing of Cr over 15% results in excessive precipitation of a Cr carbide and makes it difficult to form a fine carbide. For this reason, it is preferable to limit the content of Cr within the range of 2 to 15%. The content of Cr is more preferably 2.5 to 12.5%.

Mo: 5 to 20°

Mo is an element that is to be in solid solution in the base matrix phase, precipitates as a carbide, increases the hardness of the base matrix phase, further contributes to increase of the hardness of hard-particles, and improves wear resistance, and it is preferably contained in 5% or more. If the content is less than 5%, the amount of precipitation will be insufficient and a desired wear resistance cannot be ensured. On the other hand, if the content is over 20%, formability will deteriorate. For this reason, the content of Mo is limit within the range of 5 to 20%. The content of Mo is more preferably 7.5 to 17.5%.

Co: 2 to 30%

Co is an element that enhances the strength, especially the high temperature strength of the base matrix phase to contribute to improvement in wear resistance, and further improves the toughness of the base matrix phase and also is an element that contributes to increase of the hardness of hard-particles, and it is contained in 2% or more. On the other hand, if Co is contained in a large content of more than 30%, the hardness of the base matrix phase will decrease and desired properties cannot be ensured. For this reason, the content of Co is limit within the range of 2 to 30%.

The components described above are the basic components, and one species or two or more species selected from among V: 0 to 5%, W: 0 to 10%, Ni: 0 to 5%, S: 0 to 2%, Ca: 0 to 5%, Ca: 0 to 5%, and F: 0 to 5% may further be contained as a selective element.

V: 0 to 5%

V is an element that precipitates as a carbide, increases the hardness of the base matrix phase, and increases wear resistance, and it can be contained according to necessity. When V is contained, the content thereof is more preferably 0.5% or more. If the content is less than 0.5%, the amount of precipitation will be insufficient and a desired wear resistance cannot be ensured. On the other hand, if the content is over 5%, formability will deteriorate. For this reason, the content of V is limit within the range of 0 to 5%. The content of V is more preferably 0.5 to 2.5%.

W: 0 to 10%

W is an element that precipitates as a fine carbide, increases the hardness of the base matrix phase, and increases wear resistance, and it can be contained according to necessity. When W is contained, the content thereof is more preferably 0.5% or more. If the content is less than 0.5%, the amount of precipitation will be insufficient and a desired wear resistance cannot be ensured. On the other hand, if the content is over 10%, formability will deteriorate. For this reason, the content of N is limit within the range of 0 to 10%. When W is contained, the content thereof is more preferably 0.5 to 0.5%.

Ni: 0 to 5%

Ni is an element that contributes to improvement in the strength and the toughness of the base matrix phase and also an element that contributes to increase in the hardness of hard-particles, and it can be contained according to necessity. When Ni is contained, the content thereof is preferably 2% or more. On the other hand, containing of Ni over 5% will deteriorate the formability of the base matrix phase. For this reason, it is preferable to limit the content of Ni within a range of 0 to 5%. When Ni is contained, the content thereof is more preferably 2 to 4%.

S: 0 to 2%

S is an element that is contained in the base matrix part due to containing of solid-lubricant particles and contributes to machinability improvement, and it can be contained according to necessity. If S is contained in a content of over 2%, this leads to deterioration in toughness and ductility. For this reason, the content of S is preferably limited to 2% or less when S is contained.

Cu: 0 to 5%

Cu is an element that contributed to the improvement of the strength and the toughness of the base matrix phase, and it can be contained according to necessity. If Cu is contained in a content of over 5%, this leads to deterioration in adhesion property. For this reason, the content of Cu is preferably limited to 5% or less when Cu is contained.

Ca: 0 to 5%

Ca is an element that is contained in the base matrix part due to containing of solid-lubricant particles and contributes to machinability improvement, and it can be contained according to necessity. If Ca is contained in a content of over 5%, this leads to deterioration in ductility. For this reason, the content of Ca is preferably limited to 5% or less when Ca is contained.

F: 0 to 5%

F is an element that is contained in the base matrix part due to containing of solid-lubricant particles and contributes to machinability improvement, and it can be contained according to necessity. If F is contained in a content of over 5%, this leads to deterioration in ductility. For this reason, the content of F is preferably limited to 5% or less when F is contained.

The balance other than the above-described components are Fe and inevitable impurities. As an inevitable impurity, P: 0.1% or less is tolerable.

Next, a preferable method for producing the valve seat insert of the present invention is described.

First, an iron-base powder for forming a base matrix phase, an alloy powder, a hard-particle powder, and a solid-lubricant particle powder are blended in such a manner that the above-described prescribed valve seat insert composition is established, and then mixed and kneaded, thereby forming a mixed powder From the viewpoint of uniformity, the iron-base powder to be incorporated in the mixed powder is preferably an alloy steel powder having a composition similar to the above-described base matrix phase composition.

The alloy steel powder is preferably a powder with the high speed tool steel composition specified in JIS G 4403. The high speed tool steel is preferably of Mo-type. Regarding the alloy steel powder, besides the alloy steel with the above-described high speed tool steel composition, there can freely be used any alloy steel with a composition having the above-described hardness of 550 HV or more as the base matrix phase of the valve seat insert of the present invention and being capable of forming a fine carbide precipitation phase. It is not necessary to say that into the mixed powder there can be incorporated a graphite powder and also an alloy powder in addition to the above-described alloy steel powder in such a manner that the above-described base matrix phase composition is established. In the mixed powder, a lubricant such as zinc stearate may be incorporated.

Subsequently, the mixed powder obtained is charged into a mold and is subjected to pressing with a press working machine, thereby forming a green compact in a valve seat insert shape with prescribed dimensions. Subsequently, the green compact is subjected to a sintering process to form a sintered body.

In the present invention, the sintering process is preferably a process applied in a protection atmosphere within a temperature range of 1100 to 1200° C. for a holding time of 6 hours or more. If the heating temperature is lower than 1100° C., sintering diffusion will occur insufficiently, whereas if the heating temperature is higher than 1200° C., excessive diffusion of the hard-particles and the base-matrix will occur and wear resistance will deteriorate. It is needless to say that a step of repeating a pressing-sintering step twice or more may be carried out.

The sintered body obtained is processed into a valve seat insert (product) with desired dimensions by processing such as grinding and cutting, The valve seat insert of the present invention is preferably used in combination with a valve having the face hardness of the contact surface (valve face) with the valve seat insert being 400 HV or more, preferably 600 to 1300 HV. Examples of valves having the above-mentioned face hardness include a valve in which a nitride film is formed on a surface of a base made of heat-resistant steel (an austenite-type heat-resistant steel-made valve with nitride coating), a valve in which a nitride film is formed on a surface of a base made of non-ferrous alloy (a special alloy-made valve with nitride coating) a valve in which a nitride film is formed on a surface of a base made of special alloy steel (a special alloy steel-made valve with nitride coating) a padded valve with a TRIBALOY-type alloy padded (a TRIBALOY-type alloy-padded valve), and a padded valve with a STELLITE-type alloy or iron-base alloy-padded (a STELLITE-type alloy-padded valve, an iron-type alloy-padded valve). The valve seat insert of the present invention will afford an increased amount of wear of a valve and the valve seat insert when used in combination with a valve having the face hardness of the contact surface (valve face) with the valve seat insert being less than 400 HV as compared with when used in combination with a valve having the face hardness of contact surface with the valve seat insert being 400 HV or more, preferably 600 HV or more, and therefore a desired improvement in wear resistance cannot be expected. The valve seat insert of the present invention can be expect to exert a desired improvement in wear resistance only when being combined with a hard valve having a face hardness of a contact face (valve face) with the valve seat insert of 400 HV or more, preferably 600 HV or more.

The present invention is explained hereafter on the basis of examples.

EXAMPLES

Example 1

An iron-base powder for base matrix phase formation, a hard-particle powder, an alloy powder, and a solid-lubricant powder were prepared in the blending amounts given in Table 1, mixed, and kneaded, affording a mixed powder. The iron-base powder used was a powder having the composition given in Table 2, and the hard-particle powder used and the solid-lubricant particle powder used were the particle powders given in Table 3. Partly, a mixed powder prepared by mixing a pure iron powder with the iron-base powder was used. Zinc stearate was blended as a lubricant with the mixed powder in an amount of 1 part by mass for 100 parts by mass of the mixed powder.

Subsequently, the resulting mixed powder was charged into a mold and was processed with a press working machine to form a green compact in a prescribed valve seat insert shape, which was further subjected to sintering treatment at 1150° C. for 360 min in a protection atmosphere, thereby forming a sintered body.

The resulting sintered body was further subjected to processing such as cutting, polishing, etc., thereby affording an iron-base sintered alloy-made valve seat insert with prescribed dimensions (outer diameter: 27 mm×inner diameter: 22 mm×thickness: 6 mm).

The resulting valve seat insert was subjected to structure observation, a hardness test, a wear test, and a radial crushing strength test. Testing methods are as follows.

(1) Structure Observation

For the resulting valve seat insert, a cross section thereof perpendicular to the axial direction was polished and etched (etching solution: nital solution), thereby revealed a structure, which was then observed using an optical microscope (magnification: 200 times) and the type of the base matrix phase structure was specified. Using a scanning electron microscope (magnification: 2000 times), the particle diameter of a carbide precipitated in a base matrix phase was measured, and it was confirmed that the particle diameter of the carbide was 10 μm at most and the base matrix phase was determined as a fine carbide precipitation phase. When the maximum diameter of the particle diameter (long side length) of a carbide is larger than 10 μm, the base matrix phase was determined briefly as a carbide precipitation phase.

(2) Hardness Test

For the resulting valve seat insert, a cross section thereof was polished and etched (etching solution: nital solution), thereby revealed a structure, and then the Vickers hardness HV of the base matrix phase was measured using a Vickers hardness meter (test force: 0.98 N (100 gf)). When there were two base matrix phases, measurement was carried out for each of the phases separately.

(3) Wear Test

Figure 1:
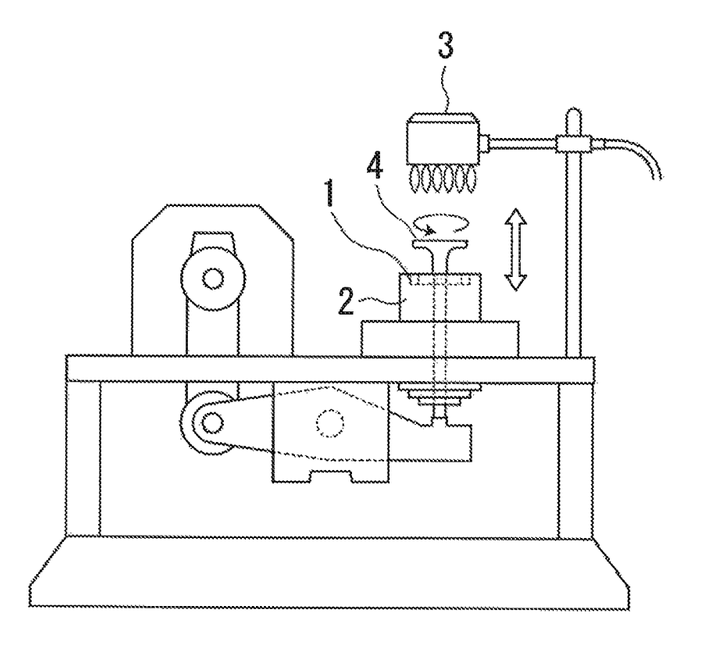
FIG. 1 is a schematic view illustrating the outline of a single rig wear testing machine. (1: valve sheet, 2: cylinder block equivalent, 3: heat device, 4: valve.)

For the resulting valve seat insert, a wear test was carried out under the test conditions shown below using a single rig wear testing machine depicted in FIG. 1.

Test temperature: 300° C. (seat face)
Test time: 12 h
Rotation number of cam: 3000 rpm
Rotation number of valve: 20 rpm
Impact load: 700 N
Valve material: heat-resistant steel with nitride film (steel type: SUH35, face hardness: 1150 HV)

After the test, the wear amount of the specimen (valve seat insert) was measured. From the wear amount measured, the wear ratio of the valve seat insert was calculated on a basis of valve seat insert No. 1 (1.00).

(4) Radial Crushing Strength Test

For the resulting valve seat insert, a radial crushing strength (kgf/mm$^2$) was determined according to the provisions of JIS Z 2507.

The obtained results are shown in Table 4.

TABLE 1

| Mixed powder No. | Iron-base powder for base matrix formation Kind*: Blending amount (% by mass) | Hard particle powder Kind**: Blending amount (% by mass) | Alloy powder Kind: Blending amount (% by mass) | Solid-lubricant powder Kind***: Blending amount (% by mass) |
| --- | --- | --- | --- | --- |
| 1  | a: 10.0, e: 50.0 | B: 35.0 | C: 1.0, Ni: 2.0 | I: 2.0 |
| 2  | a: 64.3 | B: 30.0 | C: 0.7, Co: 3.0 | I: 2.0 |
| 3  | b: 67.6 | B: 30.0 | C: 0.4 | I: 2.0 |
| 4  | c: 63.8 | B: 30.0 | C: 1.2, Co: 3.0 | I: 2.0 |
| 5  | d: 63.7 | B: 30.0 | C: 1.3, Co: 3.0 | I: 2.0 |
| 6  | a: 64.3 | A: 30.0 | C: 0.7, Co: 3.0 | I: 2.0 |
| 7  | a: 64.3 | C: 30.0 | C: 0.7, Co: 3.0 | I: 2.0 |
| 8  | a: 64.1 | D: 30.0 | C: 0.9, Co: 3.0 | I: 2.0 |
| 9  | a: 63.1 | E: 30.0 | C: 0.9, Co: 4.0 | I: 2.0 |
| 10 | a: 67.3 | B: 30.0 | C: 0.7 | I: 2.0 |
| 11 | a: 34.1, e: 30.0 | B: 30.0 | C: 0.9, Co: 3.0 | I: 2.0 |
| 12 | a: 37.1, e: 30.0, | B: 30.0 | C: 0.9 | I: 2.0 |
| 13 | a: 74.4 | B: 20.0 | C: 0.6, Co: 3.0 | I: 2.0 |
| 14 | a: 84.5 | B: 10.0 | C: 0.5, Co: 3.0 | I: 2.0 |
| 15 | a: 94.6 | — | C: 0.4, Co: 3.0 | I: 2.0 |

*See Table 2.
**See Table 3.
***I: MnS

TABLE 2

| Iron-base powder for base matrix formation No. | Component system | Chemical component (W %) | | | | | | | | |
| --- | --- | --- | --- | --- | --- | --- | --- | --- | --- | --- |
| | | C | Si | Mn | Cr | Mo | V | W | Others | Bal. |
| a | High speed steel | 0.90 | 0.40 | 0.25 | 4.0 | 5.0 | 2.0 | 6.0 | — | Fe |
| b | High speed steel | 1.25 | 0.40 | 0.25 | 4.0 | 5.0 | 3.0 | 9.5 | Co: 9.5 | Fe |
| c | Cr steel | 0.10 | 0.10 | 0.30 | 3.0 | — | — | — | — | Fe |
| d | Mo steel | — | 0.10 | 0.15 | — | 5.0 | — | — | — | Fe |
| e | Pure iron powder | — | — | — | — | — | — | — | — | Fe |

TABLE 3

| Hard particle No. | Component system | Composition | Average particle size D50 (μm) | Hardness HV |
| --- | --- | --- | --- | --- |
| A | Mo—Cr—Ni—Co-type intermetallic compound | Intermetallic compound: 25% Cr—24.5% Mo—10% Ni—2% Si-the rest Co | 70 | 1100 |
| B | Mo—Cr—Co—type intermetallic compound | Intermetallic compound: 28% Mo—8% Cr—2% Fe—2.5% Si-the rest Co | 70 | 750 |
| C | Mo—Fe—Co-type intermetallic compound | Intermetallic compound: 45% Mo—10% Fe—4% Cr—3% Si—0.2% Mn-the rest Co | 50 | 1050 |
| D | Mo—Cr—Ni—Fe-type alloy | Alloy: 13% Cr—13% Mo—4% Ni—0.55% Si-the rest Fe | 80 | 580 |
| E | Mo—Cr—Fe-type intermetallic compound | Intermetallic compound: 29.5% Mo—9.5% Cr—3% Si-the rest Fe | 50 | 900 |

TABLE 4

| Valve seat insert No. | Mixed powder No. | Base matrix part chemical component (W %) | | | | | | | | | | | Bal. | Remarks |
|---|---|---|---|---|---|---|---|---|---|---|---|---|---|---|
| | | C | Si | Mn | S | Ni | Cr | Mo | V | W | Co | Others | | |
| 1A | 1 | 1.09 | 0.9 | 1.3 | 0.7 | 2.0 | 3.2 | 10.3 | 0.2 | 0.6 | 20.8 | — | Fe* | Prior art example |
| 2A | 2 | 1.28 | 1.0 | 1.5 | 0.7 | — | 5.0 | 11.6 | 1.3 | 3.9 | 20.9 | — | Fe* | Present invention example |
| 3A | 3 | 1.25 | 1.0 | 1.5 | 0.7 | — | 5.1 | 11.8 | 2.0 | 6.4 | 24.3 | — | Fe* | Present invention example |
| 4A | 4 | 1.26 | 0.8 | 1.5 | 0.7 | — | 4.3 | 8.4 | — | — | 20.9 | — | Fe* | Comparative Example |
| 5A | 5 | 1.30 | 0.8 | 1.4 | 0.7 | — | 2.4 | 11.6 | — | — | 20.9 | — | Fe* | Comparative Example |
| 6A | 6 | 1.28 | 0.9 | 1.5 | 0.7 | 3.0 | 10.1 | 10.6 | 1.3 | 3.9 | 14.6 | — | Fe* | Present invention example |
| 7A | 7 | 1.28 | 1.2 | 1.5 | 0.7 | — | 3.8 | 16.7 | 1.3 | 3.9 | 14.3 | — | Fe* | Present invention example |
| 8A | 8 | 1.48 | <u>0.4</u> | 1.5 | 0.7 | 1.2 | 6.5 | 7.1 | 1.3 | 3.8 | 3.0 | — | Fe* | Comparative Example |
| 9A | 9 | 1.47 | 1.2 | 1.5 | 0.7 | — | 5.4 | 12.0 | 1.3 | 3.8 | 4.0 | — | Fe* | Present invention example |
| 10A | 10 | 1.31 | 1.0 | 1.5 | 0.7 | — | 5.1 | 11.8 | 1.3 | 4.0 | 17.9 | — | Fe* | Present invention example |
| 11A | 11 | 1.21 | 0.9 | 1.4 | 0.7 | — | 3.8 | 10.1 | 0.7 | 2.0 | 20.9 | — | Fe* | Comparative Example |
| 12A | 12 | 1.23 | 0.9 | 1.4 | 0.7 | — | 3.9 | 10.3 | 0.7 | 2.2 | 17.9 | — | Fe* | Comparative Example |
| 13A | 13 | 1.27 | 0.8 | 1.5 | 0.7 | — | 4.6 | 9.3 | 1.5 | 4.5 | 14.9 | — | Fe* | Comparative Example |
| 14A | 14 | 1.26 | 0.6 | 1.5 | 0.7 | — | 4.2 | 7.0 | 1.7 | 5.1 | 9.0 | — | Fe* | Comparative Example |
| 15A | 15 | 1.25 | <u>0.4</u> | 1.5 | 0.7 | — | 3.8 | 4.7 | 1.9 | 5.7 | 3.0 | — | Fe* | Comparative Example |

*Fe: Fe and inevitable impurities

| Valve seat insert No. | Mixed powder No. | Structure Kind: area % | | | | Bass matrix phase hardness HV | | Radial crushing strength kgf/mm$^2$ | Wear resistance Wear ratio (standard: 1.00) | Remarks |
|---|---|---|---|---|---|---|---|---|---|---|
| | | Base matrix phase | Hard particle** | Diffusional phase | Solid-lubricant particle | First phase*** | Second phase**** | | | |
| 1A | 1 | Fine carbide precipitation phase; 9.5, P* phase: 27.4 | B: 25.0 | Rest | MnS: 2 | 220 | 640 | 68 | 1.00 | Prior art example |
| 2A | 2 | Fine carbide precipitation phase: rest | B: 22.0 | 4.0 | MnS: 2 | 625 | — | 54 | 0.39 | Present invention example |
| 3A | 3 | Fine carbide precipitation phase: rest | B: 22.0 | 0.5 | MnS: 2 | 630 | — | 48 | 0.36 | Present invention example |
| 4A | 4 | P* phase: rest | B: 22.0 | 8.0 | MnS: 2 | <u>310</u> | — | 58 | 1.70 | Comparative Example |
| 5A | 5 | P* phase: rest | B: 22.0 | 4.0 | MnS: 2 | <u>430</u> | — | 52 | 1.15 | Comparative Example |
| 6A | 6 | Fine carbide precipitation phase: rest | A: 23.0 | 4.5 | MnS: 2 | 625 | — | 58 | 0.49 | Present invention example |
| 7A | 7 | Fine carbide precipitation phase: rest | C: 25.0 | 2.0 | MnS: 2 | 625 | — | 52 | 0.46 | Present invention example |
| 8A | 8 | Fine carbide precipitation phase: rest | <u>D</u>: 22.0 | 9.0 | MnS: 2 | 625 | — | 88 | 1.40 | Comparative Example |

TABLE 4-continued

| | | | | | | | | | | |
|---|---|---|---|---|---|---|---|---|---|---|
| 9A | 9 | Fine carbide precipitation phase: rest | E: 24.0 | 5.0 | MnS: 2 | 625 | — | 63 | 0.60 | Present invention example |
| 10A | 10 | Fine carbide precipitation phase: rest | B: 22.0 | 0.8 | MnS: 2 | 625 | — | 50 | 0.42 | Present invention example |
| 11A | 11 | Fine carbide precipitation phase: rest, P* phase: 25.0 | B: 22.0 | 7.0 | MnS: 2 | 625 | 300 | 68 | 1.05 | Comparative Example |
| 12A | 12 | Fine carbide precipitation phase; rest, P* phase: 25.0 | B: 22.0 | 6.0 | MnS: 2 | 625 | 300 | 61 | 1.20 | Comparative Example |
| 13A | 13 | Fine carbide precipitation phase: rest | B: 15.0 | 3.5 | MnS: 2 | 625 | — | 63 | 1.05 | Comparative Example |
| 14A | 14 | Fine carbide precipitation phase: rest | B: 7.0 | 2.5 | MnS: 2 | 625 | — | 82 | 1.55 | Comparative Example |
| 15A | 15 | Fine carbide precipitation phase: rest | — | 1.5 | MnS: 2 | 625 | — | 111 | 2.30 | Comparative Example |

*P: Pearlite
**See Table 3.
***Phase highest in area percentage
****Phase second highest in area percentage All present invention examples are directed to valve seat inserts each being lower in wear ratio, superior in wear resistance as compared with a conventional example (valve seat insert No. 1A), and having a radial crushing strength almost comparable with the conventional example. On the other hand, comparative examples, which are out of the scope of the present invention, are comparable with or superior to the conventional example in radial crushing strength but higher in wear ratio.

Example 2

For valve seat inserts No. 1A, No. 3A, No. 4A, and No. 11A produced in example 1, wear tests were carried out by changing the valve material. The valve materials used were the following 8 types: No. 1: austenite-type heat-resistant steel-made valve with nitride coating (face hardness: 1150 HV), No. 2: special alloy steel-type valve with nitride coating (face hardness: 950 HV), No. 3: martensite-type heat-resistant steel-made valve with nitride coating (face hardness: 850 HV), No. 4: TRIBALOY-type alloy-padded valve (face hardness: 780 HV), No. 5: STELLITE-type alloy-padded valve with nitride coating (face hardness: 700 HV), No. 6: STELLITE-type alloy-padded valve (face hardness: 425 HV), No. 7: iron-type alloy-padded valve (face hardness: 415 HV), and No. 8: special alloy steel-made valve (face hardness: 380 HV). Test conditions other than the valve material were the same as those of Example 1.

The evaluation of wear resistance was carried out by calculating a ratio of wear amount (wear ratio) in the case of combining an individual valve seat insert and an individual valve on a basis (1.00) of the case of combining valve seat insert No. 1A (Conventional Example) with valve No. 2 (special alloy steel-made valve with nitride coating).

The results obtained are given in Table 5.

TABLE 5

| Valve seat insert No. | Sintered body No. | Structure Kind: area % Base matrix phase | Hard particle** | Diffusional phase | Solid-lubricant particle | Base matrix phase hardness HV First phase*** | Second phase**** | Wear resistance Wear ratio (standard: 1.00) Valve No.***** | | | | | | | | Remarks |
|---|---|---|---|---|---|---|---|---|---|---|---|---|---|---|---|---|
| | | | | | | | | 1 | 2 | 3 | 4 | 5 | 6 | 7 | 8 | |
| 1A | 1 | Fine carbide precipitation phase: 9.5, P* phase: 27.4 | B: 25.0 | Rest | MnS: 2 | 220 | 640 | 1.05 | 1.00 | 0.80 | 0.60 | 0.62 | 0.75 | 0.75 | 0.85 | Prior art example |
| 3A | 3 | Fine carbide precipitation phase: rest | B: 22.0 | 0.5 | MnS: 2 | 630 | — | 0.36 | 0.35 | 0.45 | 0.50 | 0.55 | 0.70 | 0.72 | 0.89 | Present invention example |
| 4A | 4 | P* phase: rest | B: 22.0 | 8.0 | MnS: 2 | 310 | — | 1.90 | 1.70 | 1.60 | 1.50 | 1.45 | 1.40 | 1.40 | 1.45 | Comparative Example |

TABLE 5-continued

| Valve seat insert No. | Sintered body No. | Base matrix phase | Structure Kind: area % | | | Base matrix phase hardness HV | | Wear resistance Wear ratio (standard: 1.00) Valve No.***** | | | | | | | | Remarks |
|---|---|---|---|---|---|---|---|---|---|---|---|---|---|---|---|---|
| | | | Hard parti- cle** | Diffu- sional phase | Solid- lubri- cant particle | First phase*** | Second phase**** | 1 | 2 | 3 | 4 | 5 | 6 | 7 | 8 | |
| 11A | 11 | Fine carbide precipitation phase; rest, P* phase: 25.0 | B: 22.0 | 7.0 | MnS: 2 | 625 | 300 | 1.30 | 1.20 | 1.00 | 0.85 | 0.80 | 0.89 | 0.90 | 0.95 | Compar- ative Example |

*P: Pearlite
**See Table 3.
***Phase highest in area percentage
****Phase second highest in area percentage
*****Valve No. 1: Austenite-type heat-resistant steel-made valve with nitride coating (face hardness: 1150 HV)
Valve No. 2: Special alloy steel-made valve with nitride coating (face hardness: 950 HV)
Valve No. 3: Martensite-type heat-resistant steel-made valve with nitride coating (face hardness: 850 HV)
Valve No. 4: TRIBALOY-type alloy-padded valve (face hardness: 780 HV)
Valve No. 5: STELLITE-type alloy-padded valve with nitride coating (face hardness: 700 HV)
Valve No. 6: STELLITE-type alloy-padded valve (face hardness: 425 HV)
Valve No. 7: Iron-type alloy-padded valve (face hardness: 415 HV)
Valve No. 8: Special alloy steel-made valve (face hardness: 340 HV)

Regarding the present invention example (valve seat insert No. 3A), the wear ratio was lower than the basis (1.00) even though combined with a hard valve having a face hardness (valve face hardness) of 400 HV or more, and the wear resistance was improved as compared to Conventional Example. Especially, the present invention examples remarkably exhibited improvement in wear resistance as compared with Conventional Example (valve seat insert No. 1A) when the face hardness of a valve was 600 HV or more. Regarding the present invention example (valve seat insert No. 3A), the wear ratio was low as compared with Conventional Example (valve seat insert No. 1A) regardless of the valve combined when "hard" valves (valves No. 1 to No. 7) having a face hardness (valve face hardness) of 400 HV or more, and the wear resistance was improved as compared with Conventional Example. In the present invention examples, the wear ratio was comparable to that of Conventional Example and no improvement in wear resistance was recognized when combined with a valve (valve No. 8) having a face hardness of less than 400 HV.

On the other hand, in any Comparative Examples, which are beyond the scope of the present invention, the wear ratio was high as compared with Conventional Example (valve seat insert No. 1A) regardless of the valve combined, and the wear resistance deteriorated. Especially, when combined with "hard" valves (valves No. 1 to No. 5) having a face hardness (valve face hardness) of 600 HV or more, the wear resistance deteriorated remarkably.

As described above, it is revealed that the valve seat insert of the present invention exerts a remarkable effect of improving wear resistance when combined with a valve having a face hardness of 400 HV or more, particularly 600 HV or more.

What is claimed is:

1. A valve seat insert excellent in wear resistance for internal combustion engines, the valve seat comprising:
   an iron-base sintered alloy of hard-particles and solid-lubricant particles dispersed in a base matrix phase,
   wherein the valve seat insert has a structure in which the base matrix phase is a fine carbide precipitation phase that occupies 95% or more in area percentage of the base matrix phase,
   the fine carbide having a particle diameter of 10 μm or less and being precipitated in the fine carbide precipitation phase, and
   the base matrix phase having a hardness of 550 HV or more in Vickers hardness,
   wherein the hard-particles have a hardness of 650 to 1200 HV in Vickers hardness, and
   the hard particles being dispersed in an area percentage of 20 to 40% of the base matrix phase,
   wherein a diffusional phase is formed around the hard-particles in an area percentage of more than 0% and not more than 5% of the base matrix phase, and
   wherein the solid-lubricant particles are dispersed in an area percentage of 0 to 5% of the base matrix phase.

2. The valve seat insert made of the iron-base sintered alloy for internal combustion engines according to claim 1, wherein a base matrix part containing the base matrix phase, the diffusional phase, the hard-particles, and the solid-lubricant particles has a composition comprising, in % by mass, C: 0.5 to 2.0%, Si: 0.5 to 2.0%, Mn: 5% or less, Cr: 2 to 15%, Mo: 5 to 20%, and Co: 2 to 30%, and further one species or two or more species selected from among V: 0 to 5%, W: 0 to 10%, Ni: 0 to 5%, S: 0 to 2%, Cu: 0 to 5%, Ca: 0 to 5%, and F: 0 to 5%, the balance being Fe and inevitable impurities.

3. The valve seat insert made of the iron-base sintered alloy for internal combustion engines according to claim 2, wherein the solid-lubricant particles are of one species or two or more species selected from among manganese sulfide MnS, molybdenum disulfide $MoS_2$, and calcium fluoride $CaF_2$.

4. An assembly excellent in wear resistance of a valve and a valve seat insert, wherein
   the valve is a valve having a face hardness of a contacting face with the valve seat insert being 400 to 1300 HV in Vickers hardness, and
   the valve seat insert is the valve seat insert made of the iron-base sintered alloy for internal combustion engines according to claim 3.

5. The valve seat insert made of the iron-base sintered alloy for internal combustion engines according to claim 2, wherein the hard-particles are of one species or two or more species selected from among Mo—Cr—Co-type intermetallic compound particles comprising, in % by mass, Cr: 3 to 15% and Mo: 20 to 40%, further Si: 0 to 3% and Fe: 0 to 3%, the balance being Co and inevitable impurities, Mo—Cr—Ni—Co-type intermetallic compound particles comprising Mo: 20 to 30%, Ni: 5 to 20%, and Cr: 15 to 35%, further Si: 0 to 3%, the balance being Co and inevitable impurities, Mo—Cr—Fe-type intermetallic compound particles comprising Mo: 20 to 40% and Cr: 3 to 15%, further Si: 0 to 3%, the balance being Fe and inevitable impurities, and Mo—Fe—Co-type intermetallic compound particles comprising Mo: 30 to 50% and Fe: 15% or less, further Cr: 2 to 8% and Si: 0 to 4%, the balance being Co and inevitable impurities.

6. An assembly excellent in wear resistance of a valve and a valve seat insert, wherein
the valve is a valve having a face hardness of a contacting face with the valve seat insert being 400 to 1300 HV in Vickers hardness, and
the valve seat insert is the valve seat insert made of the iron-base sintered alloy for internal combustion engines according to claim 2.

7. The valve seat insert made of the iron-base sintered alloy for internal combustion engines according to claim 1, wherein the hard-particles are of one species or two or more species selected from among Mo—Cr—Co-type intermetallic compound particles comprising, in % by mass, Cr: 3 to 15% and Mo: 20 to 40%, further Si: 0 to 3% and Fe: 0 to 3%, the balance being Co and inevitable impurities, Mo—Cr—Ni—Co-type intermetallic compound particles comprising Mo: 20 to 30%, Ni: 5 to 20%, and Cr: 15 to 35%, further Si: 0 to 3%, the balance being Co and inevitable impurities, Mo—Cr—Fe-type intermetallic compound particles comprising Mo: 20 to 40% and Cr: 3 to 15%, further Si: 0 to 3%, the balance being Fe and inevitable impurities, and Mo—Fe—Co-type intermetallic compound particles comprising Mo: 30 to 50% and Fe: 15% or less, further Cr: 2 to 8% and Si: 0 to 4%, the balance being Co and inevitable impurities.

8. The valve seat insert made of the iron-base sintered alloy for internal combustion engines according to claim 7, wherein the solid-lubricant particles are of one species or two or more species selected from among manganese sulfide MnS, molybdenum disulfide $MoS_2$, and calcium fluoride $CaF_2$.

9. An assembly excellent in wear resistance of a valve and a valve seat insert, wherein
the valve is a valve having a face hardness of a contacting face with the valve seat insert being 400 to 1300 HV in Vickers hardness, and
the valve seat insert is the valve seat insert made of the iron-base sintered alloy for internal combustion engines according to claim 8.

10. An assembly excellent in wear resistance of a valve and a valve seat insert, wherein
the valve is a valve having a face hardness of a contacting face with the valve seat insert being 400 to 1300 HV in Vickers hardness, and
the valve seat insert is the valve seat insert made of the iron-base sintered alloy for internal combustion engines according to claim 7.

11. An assembly excellent in wear resistance of a valve and a valve seat insert, wherein
the valve is a valve having a face hardness of a contacting face with the valve seat insert being 400 to 1300 HV in Vickers hardness, and
the valve seat insert is the valve seat insert made of the iron-base sintered alloy for internal combustion engines according to claim 1.

\* \* \* \* \*